Figure 1:
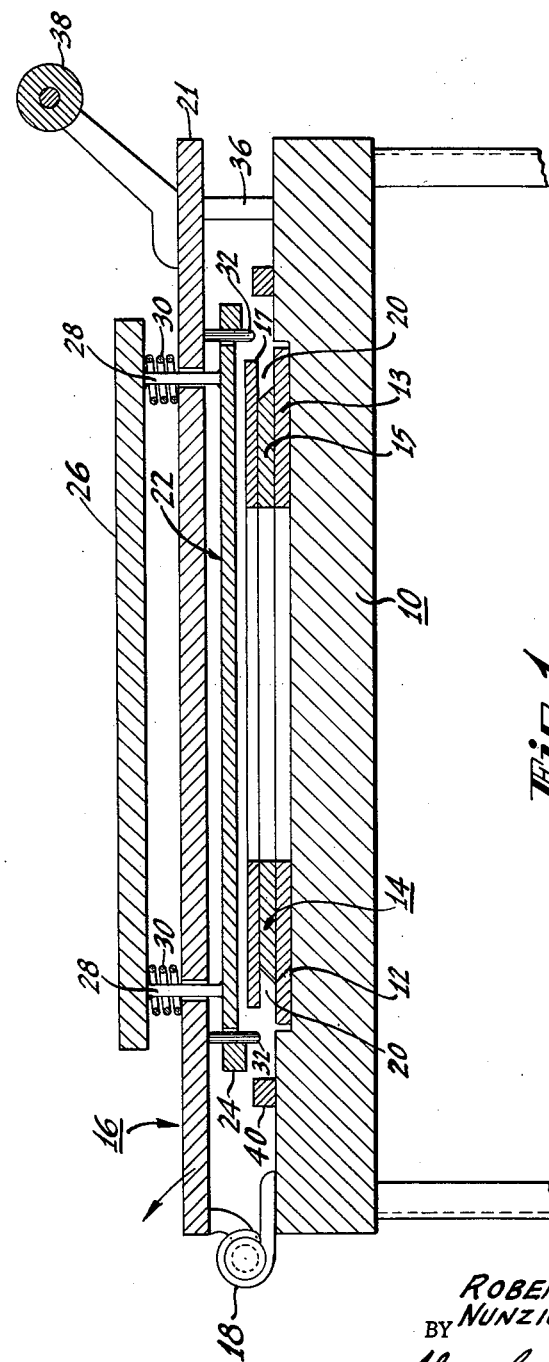

INVENTORS
ROBERT D. FARKAS &
BY NUNZIO ZINGALE

Charles H. Brown
ATTORNEY

May 22, 1962 R. D. FARKAS ET AL 3,035,960
METHOD AND APPARATUS FOR MAKING THERMOPLASTIC
COVERS WITH AN ELASTIC BAND SEALED
IN THE FOLDED EDGE THEREOF
Filed June 14, 1960 4 Sheets-Sheet 4
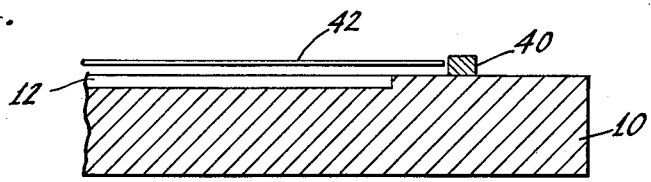
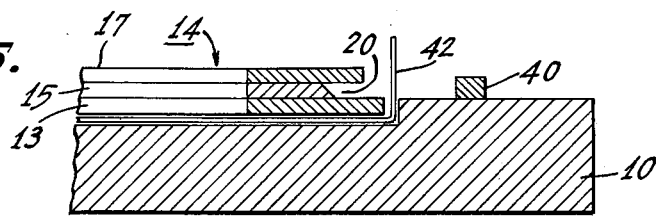
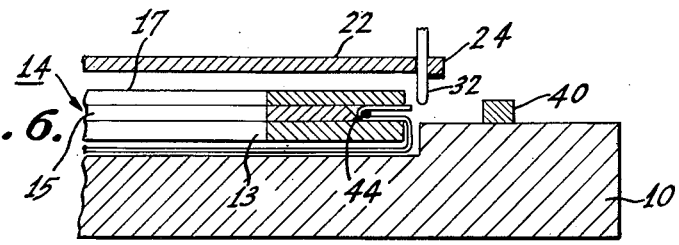
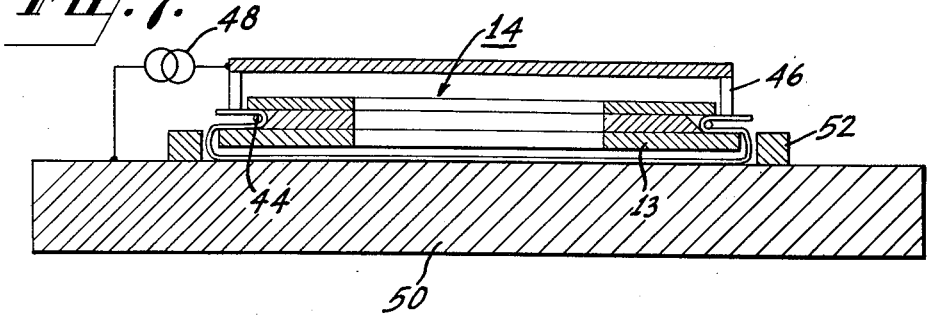
INVENTORS
ROBERT D. FARKAS &
BY NUNZIO ZINGALE
Charles H. Brown
ATTORNEY

United States Patent Office 3,035,960
Patented May 22, 1962

3,035,960
METHOD AND APPARATUS FOR MAKING THERMOPLASTIC COVERS WITH AN ELASTIC BAND SEALED IN THE FOLDED EDGE THEREOF
Robert D. Farkas, Woodmere, N.Y., and Nunzio Zingale, 21 Fenway St., Yonkers, N.Y.; said Farkas assignor to said Zingale
Filed June 14, 1960, Ser. No. 35,967
17 Claims. (Cl. 156—196)

This invention relates to a method of and apparatus for making removable protective covers fabricated from plastic dielectric material and which covers require a distensible and contractible elastic band around the marginal area or edge portion thereof. Such covers may be used for many purposes, such as shower caps, bowl covers, lamp shade covers, covers for various containers and articles to protect them and/or the contents thereof from dust, dirt, or contamination, and baby pants having elastic bands at the waist and leg openings. These covers require a stretchable or elastic opening so that they can be stretched over and embrace the item to be covered without the need for conventional drawstrings.

Among the objects of the invention are: To simplify the manufacture of articles having openings which are distensible and contractible; and to enable the easy fabrication and sealing of folds at the edge or marginal area of thermoplastic sheet materials which require an elastic band within the fold.

In brief, the apparatus for fabricating the covers can be considered as two machines. One machine forms the fold in the work blank of the thermoplastic dielectric material, and includes a bed having a depression for accommodating therein a notched or grooved mandrel, in turn, adapted to be placed over the work blank, and a main frame assemblage movable in position over the mandrel and provided with an ejector mechanism for enabling an elastic band to be pushed over the marginal area of the work blank to produce a fold. The novel construction and cooperating elements of this machine and the method of manipulating such elements are important features of the present invention. The other machine may be separate and apart from the first machine or combined therewith, and, in effect, is a conventional electronic (dielectric) heat sealing machine having a press for causing an electrode to engage and exert pressure on the folded portions of plastic dielectric material to be sealed while at the same time applying high frequency energy to the electrode to thereby bond or heat-seal the fold with the elastic band completely sealed within the fold. The sealing together of the folded portions is the result of fusing together the thermoplastic film or sheet stock.

Figure 2:
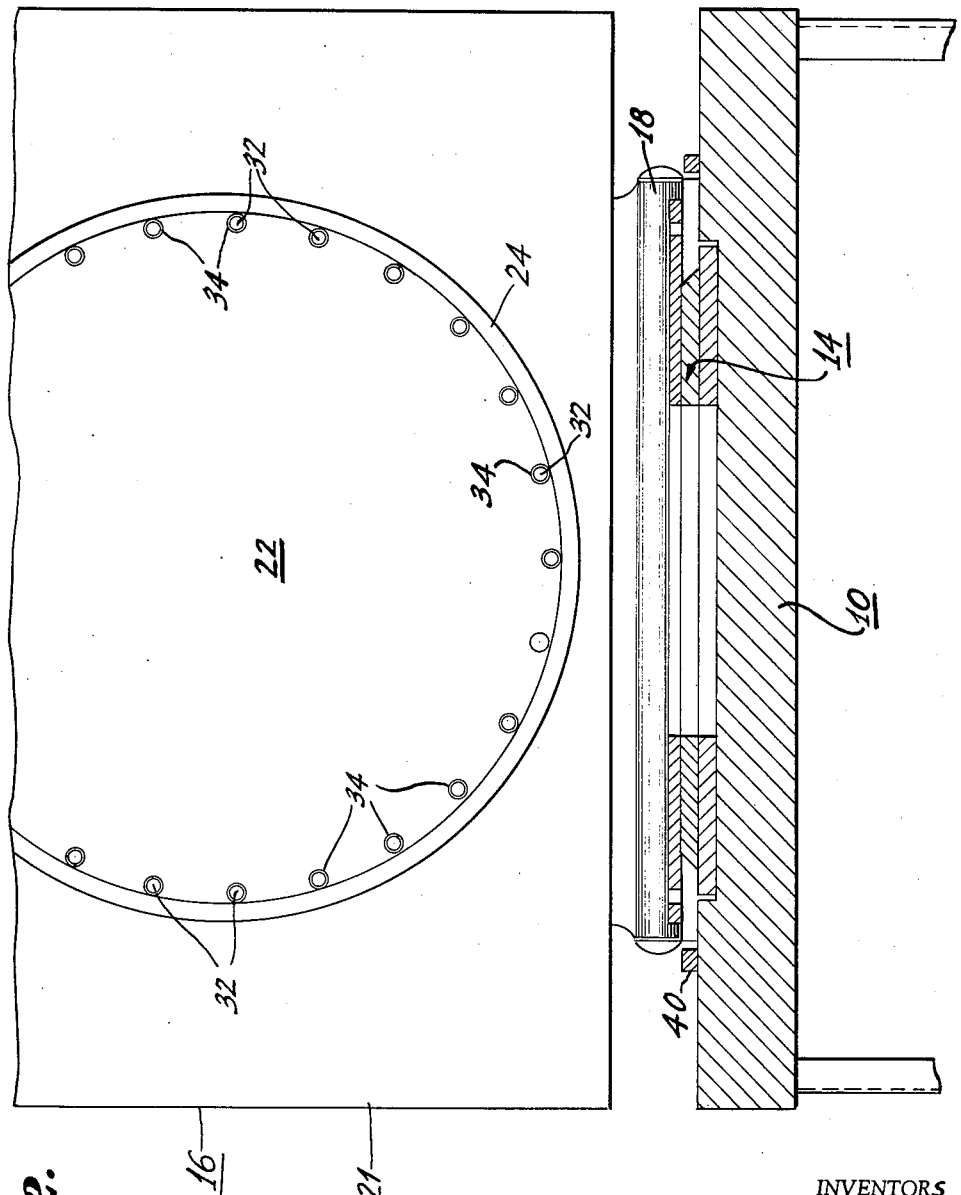
Figure 3:
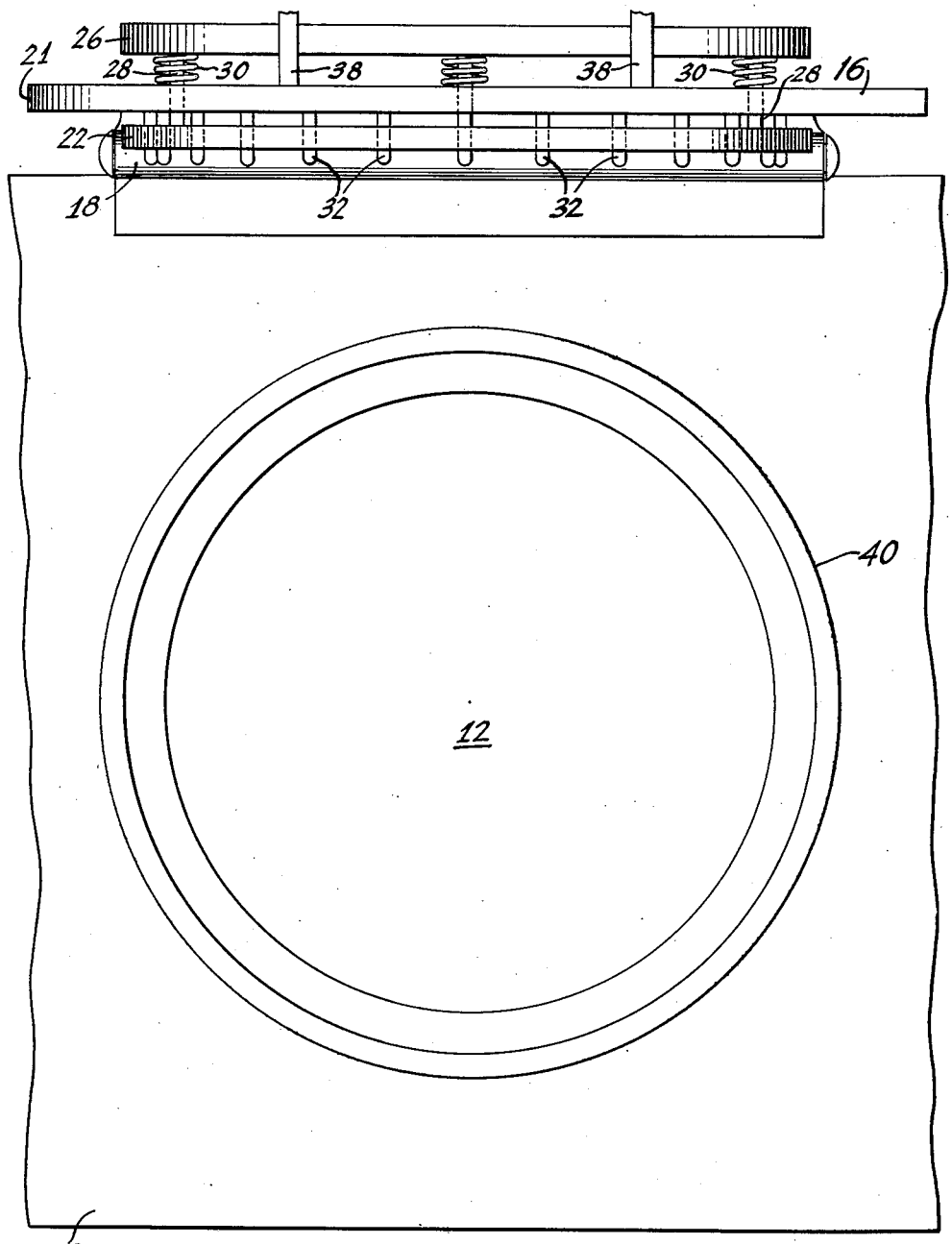

A more detailed description of the invention follows, in conjunction with drawings, wherein:

FIG. 1 is a sectional view of the apparatus, constructed in accordance with the invention, for forming the fold in the thermoplastic material work blank, FIG. 2 is an elevational view partly in section, of the apparatus as seen from the right of FIG. 1, with the main frame assemblage pivotally moved to a vertical position, FIG. 3 is a plan view of FIG. 2 with the mandrel removed from the table bed, FIGS. 4, 5 and 6 are fragmentary views of the apparatus of FIGS. 1, 2 and 3, illustrating the sequential steps in the formation of the fold along the marginal or edge area of the flat work blank, and FIG. 7 is a fragmentary view of a conventional electronic heat sealing machine, illustrating the step of bonding together the folded edge portions of the work blank with the elastic band sealed within the fold.

Throughout the figures of the drawing the same parts are represented by the same reference numerals.

The apparatus of the invention illustrated in FIGS. 1 to 6 comprises a table bed 10 in which there is a depression 12, a metallic mandrel 14 having top and bottom flat surfaces, and a main frame assemblage 16 pivotally connected by a hinge 18 to the table bed 10. The metallic mandrel 14 is shown as having three integrally connected plies 13, 15 and 17. The lower ply 13 has the largest diameter or longest dimension of the three metallic plies and has a depth equal to the depth of the depression 12 in the table bed. The middle ply 15 has the smallest diameter of the three plies and has a slanted groove or notch 20 around the entire mandrel. The diameter or long dimension of the middle ply 15 is thus shorter than the diameters or long dimension of the other two plies of the mandrel. The groove 20 slopes inwardly from the bottom edge of the middle ply to the top edge thereof, as shown in the drawing. In effect, the groove 20 has upper and lower boundaries and an intermediate boundary. The upper ply 17 is smaller than the lower ply 13. The depression is only slightly larger in diameter, about 1/16" larger, than the ply 13 and serves, as one of its function, to locate the mandrel relative to the main frame assembly 16. The depth of the depression 12 in the table 10 is equal to the thickness of the lower ply 13 of the mandrel, as shown in the several figures of the drawing; or, stated in other words, the distance between the bottom surface of the mandrel and the lower boundary of the groove is equal to the depth of the depression. The shape of the depression 12 corresponds to that of the mandrel 14; thus, if the mandrel is circular then the depression is also circular. The mandrel can be made of any metallic material, preferably a light-weight metal such as aluminum, and, in the interest of economy and ease in handling by the operator, should preferably be hollow. The table bed 10 can be made of any suitable material, such as wood or metal.

The main frame assembly is rotatable in the direction of the arrow over an angle slightly greater than 90° so as to be capable of resting in a position at an angle from the vertical. This assemblage comprises a sturdy main plate 21, an ejector ring 22 having a shoulder 24 along its edge, as shown, and a depressor plate 26 integrally secured to the ejector ring by a plurality of connecting links or bars 28. Between the depressor plate 26 and the main frame plate and surrounding each link 28 there is a coiled spring 30 which can be compressed by a force acting on the plate 26. Springs 30 displace plate 26 from main plate 21 at all times except when plate 26 is momentarily struck, either by hand or by an appropriate pneumatic system.

Fastened to the main plate 21 and arranged in a circle on a diameter slightly larger than the lower ply 13 of the mandrel 14, there are a plurality of uniformly spaced and physically parallel pins 32. These pins 32 pass snugly but freely through holes 34 in the ejector ring located adjacent the inner surface of the shoulders 24 of the ejector ring. Pins 32 are of such length that the lowermost pointed or rounded ends thereof in the downward position of the main frame assembly, as shown in FIG. 1, are at the level of the lower horizontal surface of the upper ply of the mandrel. The purpose of these pins is to locate the elastic band 44 which is to be placed in the tubular fold of the plastic edge to be sealed. Also rigidly fastened to the main frame plate 21 is a stop 36 which serves to keep the main frame assemblage horizontal in the down position shown in FIG. 1, and a handle 38 for lifting the entire main frame assemblage when it is desired to load the pins 32 with an elastic band, such as a rubber band.

An annular ring 40 secured to the table bed 10, as shown, serves to locate the film or sheet-like thermoplastic work blank 42 whose edge portion is to be folded around the elastic band and sealed with the elastic band therewithin. This work blank has the same shape as the mandrel and the depression; for example, circular if the mandrel and the depression are circular. The shape however can be square, oblong or oval provided that all co-operating elements of the apparatus have the same shape; for example, the work blank, the depression in the table, the mandrel, the work locating ring 40, the arrangement of the pins 32 and their surrounding holes 34, as well as the shape of the electrode 46 (note FIG. 7) on the high frequency heat sealing machine.

The method of operating the apparatus will now be given. The main frame assemblage 16, including its associated elements, is raised by handle 38 from the horizontal position shown in FIG. 1 over an angle slightly more than 90° relative to the horizontal plane of the table. The apparatus will thus assume the position shown generally in FIGS. 2 and 3. The elastic band 44, for example, a rubber band, is stretched and then placed around the pins 32 at a location near to but between the free rounded or pointed ends of the pins 32 and the ejector ring 22.

With the mandrel 14 removed from the table, the flat thermoplastic work blank 42 is positioned within the work locating annular ring 40 on the table 10 so that the peripheral edge of the blank is adjacent the inner vertical surface of the ring 40, as shown in FIG. 4. The mandrel 14 is then placed over the work blank 42 and into the depression 12 of the table 10, thus causing the edge of marginal area of the work blank 42 to bend and rise in the vertical plane so that the edge portion is at least above the notch or groove 20 in the center ply of the mandrel, as shown in FIG. 5.

The main frame assemblage should then be lowered to assume the position shown in FIG. 1. A momentary force as by the blow of the hand is now applied to the center of depressor plate 26 in a downward direction and of such magnitude as to overcome the upward force exerted by springs 30 and the frictional forces of the elastic band as the shoulder 24 of the ejector ring 22 is forced downward against the elastic band. The elastic band is thus forced off the ends of the pins 32 by the shoulder 24 and into the notch 20 of the mandrel. Because the pins 32 are on the outside of the upwardly rising edge portions (note FIG. 5) of the work blank, the elastic band, which is forced off the ends of the pins, in turn, forces the edge portion of the work blank into the slanted groove or notch in the mandrel, locking it there, and produces a fold with overlapping areas, as shown in FIG. 6. These overlapping areas of the fold extend beyond the elastic band 44 and beyond the outer edge of the ply 17 of the mandrel.

After the fold, as shown in FIG. 6, has been produced, the operator raises the main frame assemblage 16 to its fully open position and removes the mandrel 14 loaded with the work blank (the thermoplastic work blank is attached to the mandrel at the groove) thus enabling him to place another unloaded mandrel above another thermoplastic work blank and to repeat the process with the apparatus of FIGS. 1 to 5. The loaded mandrel which was removed from the apparatus of FIGS. 1 to 5 is then handed over to another operator at a conventional high frequency heat sealing machine for performing the heat sealing or bonding step as shown in FIG. 7. The heat sealing machine of FIG. 7 includes a high frequency oscillation generator 48 generating a frequency in the range of 10 mc. to 50 mc. and which is electrically connected between a circular electrode 46 and the metallic bed 50 upon which the loaded mandrel is placed within a locating or positioning annular ring 52. By a suitable means, such as a foot treadle, the electrode 46 is lowered under the pressure of a ram or press so that the electrode 46 engages the overlapping portions of the fold of the thermoplastic material. The high frequency current is then turned on to cause a fusing together of the overlapping portions, thus completely sealing the distensible and contractible elastic band within the sealed fold.

When the electrode 46 of the heat sealing machine engages the overlapping portions of the fold for the sealing operation, the complete electrical circuit for the oscillation generator 48 includes two serially arranged capacitors, one capacitor being at the location of the fold (between the bottom of the electrode 46 and the upper surface of ply 13 of the mandrel), and the other capacitor being very much larger and being at the location between the bottom of the mandrel and the upper surface of the metallic bed 50. Since the respective values of these capacitors are functions of area, the effective voltage at the location of the one capacitor (at the fold) is much larger than that at the location of the other capacitor (at the bottom of the mandrel).

In the operation of the apparatus of the invention, an operator can be supplied with a quantity of unloaded mandrels, and a number of work blanks and elastic bands. As each removable mandrel is loaded with a work blank and an elastic band in the manner shown in FIG. 6, it may then be passed on to another operator who performs the heat sealing step on the folded work blank in a dielectric heat sealing machine. By making the mandrel of aluminum or any similar light-weight metal and placing a large central hole in the mandrel to further lighten its weight, the mandrel is easily handled and requires little effort to manipulate. The mandrel can be formed out of a solid cylindrical piece with the edges ground to provide the desired configuration, without requiring individual plies fastened together. The unique configuration of the mandrel enables the work blank to be easily locked within the slanted groove and form overlapping portions of the fold, and also enables the sealing to occur solely at the location of the fold with no heating in other areas of the work blank. Inasmuch as a heat sealing machine is expensive while mandrels made according to the invention are relatively cheap, the apparatus and method of the invention lend themselves to an efficient and economical operation in which a multiplicity of mandrels can be used to feed a single heat sealing machine.

We claim:
1. Apparatus for fabricating a cover having a stretchable opening from a flat work blank, comprising a table bed having a depression, a mandrel having top and bottom flat surfaces of the same general configuration as but somewhat smaller in diameter than said depression, said mandrel having a groove around it and intermediate said surfaces, said groove having upper and lower boundaries and an intermediate boundary, the distance between the bottom surface of said mandrel and the lower boundary of said groove being equal to the depth of said depression, said mandrel when placed in said depression over a work blank causing the marginal area of said blank to rise above said groove, and means fo releasing an elastic band over said marginal area to lock the same in said groove and thereby form a fold having overlapping portions around said elastic band.

2. Apparatus for fabricating a cover having a stretchable opening from a flat work blank, comprising a table bed having a depression, a mandrel having top and bottom flat surfaces of the same general configuration as but somewhat smaller in diameter than said depression, said mandrel having a groove around it and intermediate said surfaces, the distance between the bottom surface of said mandrel and the lower boundary of said groove being equal to the depth of said depression, work blank locating means on said bed around and above said depression, said mandrel when placed in said depression over a work blank previously suitably positioned by said work locating means causing the marginal area of said blank to rise above said groove, and means for releasing an elastic band over said marginal area to lock the same in said groove and thereby form a fold having overlapping portions around said elastic band.

3. Apparatus for fabricating a cover having a stretchable opening from a flat work blank of thermoplastic material, comprising a table bed having a circular depression, a metallic mandrel of generally cylindrical form having an annular groove intermediate both ends of the mandrel, the depth of the depression in the bed being substantially equal to the distance from the lower boundary of the groove to the bottom of the mandrel, the diameter of the mandrel below the groove being slightly less than the diameter of the circular depression, the diameter of the mandrel above the groove being less than the diameter of the mandrel below the groove, a work blank locating ring on the bed having an inside diameter larger than that of the depression, said mandrel when placed in said depression and over a work blank positioned inside said ring causing the marginal area of said blank to rise above said groove, and means for releasing an elastic band over said marginal area to lock the same in said groove and thereby form a fold having overlapping portions around said elastic band, and means for engaging the overlapping portions of said fold on said mandrel to thereby enable sealing in the elastic band within said fold.

4. Apparatus for fabricating a protective cover having a stretchable opening from a work blank of thermoplastic material, comprising a table bed having a depression, a mandrel of light weight metal having top and bottom flat surfaces of the same general configuration as but somewhat smaller in size than said depression, said mandrel having a groove around it and intermediate said surfaces, said mandrel also having a relatively large central hole extending between said top and bottom surfaces, the distance between the lower boundary of said groove and the bottom of said mandrel being equal to the depth of said depression, work blank locating means on said bed around and above said depression, said mandrel when placed in said depression over a work blank previously suitably positioned by said work blank locating means causing the marginal area of said blank to rise above said groove, and means for releasing an elastic band over said marginal area to lock the same in said groove and thereby form a fold having overlapping portions of said fold on said mandrel to thereby enable sealing in the elastic band within said fold.

5. For use in apparatus for fabricating a protective cover having a stretchable opening from a work blank of thermoplastic material, a bed having a circular depression, and a removable annulus-shaped mandrel adapted to fit at least partially in said depression and around which the work blank is adapted to be positioned, said mandrel having top and bottom flat surfaces and an annular groove intermediate said surfaces, the diameter of the mandrel above the groove being less than the diameter of the mandrel below the groove.

6. For use in apparatus for fabricating a protective cover having a stretchable opening from a work blank of thermoplastic material, a table bed having a depression and a removable mandrel of the same configuration as said depression adapted to fit at least partially in said depression and around which the work blank is adapted to be positioned, said mandrel having top and bottom flat surfaces and a groove around it intermediate said surfaces, the width of said mandrel above said groove being less than the width of said mandrel below said groove.

7. For use in apparatus for fabricating a protective cover having a stretchable opening from a flat work blank, a removable and portable mandrel around which the work blank is adapted to be positioned having flat top and bottom surfaces and an annular groove intermediate said surfaces, the diameter of said mandrel above said groove being smaller than the diameter of said mandrel below said groove.

8. For use in apparatus for fabricating a protective cover having a stretchable opening from a work blank of thermoplastic material, a removable and portable mandrel around which the work blank is adapted to be positioned, said mandrel having a top and a bottom surface and an intermediately located groove, and means surrounding said mandrel for supporting an elastic band and responsive to a momentarily exerted force for releasing said elastic band and locking the marginal area of said work blank in said groove, to thereby form a fold having overlapping portions.

9. For use in apparatus for fabricating a protective cover having a stretchable opening from a work blank of thermoplastic material, a removable and portable mandrel around which the work blank is adapted to be positioned, said mandrel having a top and a bottom surface and an intermediately located groove, and a frame assemblage mounted on a hinge and rotatably movable in position over the mandrel, said assemblage including a plurality of uniformly spaced pins adapted normally to surround a portion of the mandrel above the groove for supporting an elastic band, and ejector mechanism responsive to a momentarily exerted force for forcing said elastic band from said pins thereby permitting the band to contract and draw a portion of the work blank into said groove to form a fold in said blank having overlapping portions.

10. For use in apparatus for fabricating a protective cover having a stretchable opening from a work blank of sheet material, a mandrel of a size smaller than said work blank and having a groove around it located intermediate the ends thereof and causing a marginal portion of said work blank to surround said groove when the mandrel is placed above and rests on said work blank, movable means for positioning a plurality of uniformly spaced and physically parallel pins around said groove, said pins being adapted to support an elastic band distended to fit around said pins, and means responsive to a momentary blow for ejecting said band from said pins thereby permitting the band to contract and lock said work blank in said groove and form a fold in said blank with overlapping portions around said elastic band.

11. For use in apparatus for fabricating a protective cover having a stretchable opening from a work blank of sheet material, a mandrel of a size smaller than said work blank and having a groove around it located intermediate the ends thereof and causing a marginal portion of said work blank to surround said groove when said mandrel rests against said work blank, and a frame assemblage mounted on a hinge and rotatably movable to a horizontal position, said assemblage including a main frame plate, a depressor plate on the outside of said main plate integrally joined to an ejector ring on the inside of said main frame plate by means of links freely passing through holes in said main plate, coil springs around said links between said depressor plate and said main plate, a plurality of uniformly spaced and physically parallel pins of the same size secured at one end to said main frame plate and extending through separate holes in said ejector ring to a point spaced from but adjacent said mandrel, whereby the free ends of said pins surround a portion of said mandrel above said groove, said pins being adapted to support an elastic band distended to fit around the pins, said ejector ring being responsive to a force applied to said depressor plate for forcing said elastic band off from said pins and into said groove, thereby locking a portion of said work blank in said groove.

12. The method of fabricating a cover having a stretchable opening from a flat work blank of thermoplastic material, with the aid of a mandrel having a long dimension which is less than the long dimension of said work blank, said mnadrel having a groove intermediate its ends, and a plurality of uniformly spaced and parallelly arranged pins of equal length surrounding and spaced from said mandrel, said pins having free ends adjacent said mandrel, including the steps of positioning said mandrel over said work blank so that at least the marginal edge of the blank is between said mandrel and said pins and overlies the groove of the mandrel, distending an elastic band and supporting said distended band on said pins at a position around said mandrel, and forcing said distended elastic band from the free ends of said pins to thereby cause said band to contract and draw a portion of said blank into said groove and form a fold having overlapping portions, then heat-sealing said overlapping portions of said fold to seal in said elastic band within said fold.

13. Apparatus as defined in claim 11, wherein said ejector ring is provided with a shoulder on the outside of said pins for exerting a force on said elastic band in response to pressure applied to said depressor plate.

14. Apparatus as defined in claim 7, wherein the innermost wall of said groove slopes inwardly from the bottom edge of the groove to the top edge of the groove.

15. A method of making a circular cover having a stretchable opening from a work blank of thermoplastic material with the aid of a generally cylindrical mandrel having an annular groove intermediate the ends thereof, and a horizontal table bed having a circular depression of a diameter slightly larger than that of said mandrel but less than that of said work blank, comprising placing the work blank above said bed and across said depression, placing said mandrel above said blank and into said depression thereby causing the marginal edge of the blank to curve around said mandrel over said groove, positioning a circular support supporting a distended elastic band around but spaced from said mandrel and the curved marginal edge of said blank, forcing said elastic band from said support in the vicinity of said groove thereby permitting the elastic band to contract and draw the marginal edge of the blank into said groove and produce a fold in said blank with overlapping portions around said band, and applying heat to said overlapping portions to fuse them together with the elastic band sealed in the fold.

16. For use in apparatus for fabricating a protective cover having a stretchable opening from a work blank of thermoplastic material, a table bed having a depression, and a removable mandrel of the same configuration as said depression insertable at least partially in said depression and around which the work blank is adapted to be positioned, said mandrel having top and bottom flat surfaces and a groove around it intermediate said surfaces, the long dimension of said mandrel above said groove being less than the long dimension of said mandrel below said groove, and a frame assemblage hingedly secured to said table bed and movable in position over said mandrel for supporting an elastic band and for releasing said band in a position adjacent said groove.

17. Apparatus for fabricating a cover having a stretchable opening from a flat work blank of thermoplastic material, comprising a table bed having a circular depression, a metallic mandrel of generally cylindrical form having an annular groove intermediate both ends of the mandrel, said groove having upper and lower boundaries and an intermediate boundary, the depth of the depression in the bed being substantially equal to the distance from the lower boundary of the groove to the bottom of the mandrel, the diameter of the mandrel below the groove being slightly less than the diameter of the circular depression, the diameter of the mandrel above the groove being less than the diameter of the mandrel below the groove, a work blank locating ring on the bed having an inside diameter larger than that of the depression, said mandrel when placed in said depression and over a work blank positioned inside said ring causing the marginal area of said blank to rise above said groove, and means for releasing an elastic band over said marginal area to lock the same in said groove and thereby form a fold having overlapping portions around said elastic band, and means for engaging the overlapping portions of said fold on said mandrel to thereby enable sealing in the elastic band within said fold, said means for releasing the elastic band comprising a frame assemblage hingedly mounted on said table bed and movable in position over said mandrel.

References Cited in the file of this patent

UNITED STATES PATENTS

| | | |
|---|---|---|
| 2,432,662 | Gardner | Dec. 16, 1947 |
| 2,466,643 | Magid | Apr. 5, 1949 |
| 2,580,075 | Clark et al. | Dec. 25, 1951 |
| 2,758,631 | Peterson et al. | Aug. 14, 1956 |
| 2,957,792 | Magid | Oct. 25, 1960 |